(12) United States Patent
Myers et al.

(10) Patent No.: US 12,081,024 B1
(45) Date of Patent: Sep. 3, 2024

(54) POWER PATH CONTROL MANAGEMENT CIRCUIT

(71) Applicant: M4CL Productions, LLC, Gainesville, FL (US)

(72) Inventors: Charles Thomas Myers, Gainesville, FL (US); Dennis Lukso, Tucson, AZ (US)

(73) Assignee: M4CL Productions, LLC, Gainesville, FL (US)

( * ) Notice: Subject to any disclaimer, the term of this patent is extended or adjusted under 35 U.S.C. 154(b) by 0 days.

(21) Appl. No.: 18/510,001

(22) Filed: Nov. 15, 2023

(51) Int. Cl.
| | |
|---|---|
| *H01H 50/58* | (2006.01) |
| *H01H 51/27* | (2006.01) |
| *H02J 3/00* | (2006.01) |
| *H02J 9/06* | (2006.01) |
| *B60R 16/03* | (2006.01) |

(52) U.S. Cl.
CPC ............... *H02J 3/007* (2020.01); *B60R 16/03* (2013.01)

(58) Field of Classification Search
CPC ................................. H02J 3/007; B60R 16/03
USPC ......................................................... 307/52
See application file for complete search history.

(56) References Cited

U.S. PATENT DOCUMENTS

| | | | |
|---|---|---|---|
| 6,285,091 B1 * | 9/2001 | Chan ....................... | H02J 9/061 307/64 |
| 7,501,720 B2 * | 3/2009 | Popescu-Stanesti ......................... | H02J 7/0068 307/66 |
| 10,566,834 B2 * | 2/2020 | Yu ........................... | H01H 50/58 |
| 2007/0194759 A1 * | 8/2007 | Shimizu .................. | H02J 7/345 320/166 |
| 2007/0222295 A1 * | 9/2007 | Wareham .......... | H02J 13/00007 307/32 |
| 2017/0199244 A1 * | 7/2017 | Hermann ............. | G01R 31/364 |

FOREIGN PATENT DOCUMENTS

| | | | |
|---|---|---|---|
| CN | 217788302 | * | 11/2022 |
| JP | 5794091 B2 | | 10/2015 |
| WO | 2023/140010 A1 | | 7/2023 |

\* cited by examiner

*Primary Examiner* — Rexford N Barnie
*Assistant Examiner* — Xuan Ly
(74) *Attorney, Agent, or Firm* — Caldwell Intellectual Property Law

(57) ABSTRACT

A power path control management circuit includes a first power conduit including a first switching component connecting a first power input terminal to an output terminal, a second power conduit including a second switching component connecting a second power input terminal to the output terminal, and at least a power source controller communicatively connected to the first switching component and the second switching component and configured to detect a reverse current condition in the first power conduit and switch off the first switching component, and at least a parameter output component, the at least a parameter output component configured to output at least an electrical parameter from the circuit to an exterior meter, wherein the exterior meter is communicatively coupled to at least one of the first power source and the second power source.

19 Claims, 5 Drawing Sheets

POWER PATH CONTROL MANAGEMENT CIRCUIT

FIELD OF THE INVENTION

The present invention generally relates to the field of power electronics. In particular, the present invention is directed to a power path control management circuit.

BACKGROUND

The importance of electrical power is mounting steadily, particularly with regard to vehicles. Often the limiting factor in use of electrical power is the power source, which inevitably suffers from one shortcoming or another.

SUMMARY OF THE DISCLOSURE

In an aspect, a power path control management circuit includes a first power input terminal electrically connected to a first power source, a second power input terminal electrically connected to a second power source, an output terminal connected to a load, a first power conduit, the first power conduit including a first switching component connecting the first power input terminal to the output terminal, wherein the first switching component includes a first control terminal, a second power conduit, the second power conduit including a second switching component connecting the second power input terminal to the output terminal, wherein the second switching component includes a second control terminal, at least a power source controller, wherein, the at least a power source controller is communicatively connected to the first switching component and the second switching component, the at least a power source controller includes a first signal terminal electrically connected to the first control terminal and a second signal terminal electrically connected to the second control terminal, and the at least a power source controller is configured to detect a reverse current condition in the first power conduit and switch off the first switching component using the first signal terminal, and at least a parameter output component, the at least a parameter output component configured to output at least an electrical parameter from the circuit to an exterior meter, wherein the exterior meter is communicatively coupled to at least one of the first power source and the second power source.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of this disclosure include circuits to manage multiple power sources and provide to a load. Switching elements and procedures are used to select a source having a higher voltage level and disconnect sources having lower voltage levels; voltage clamps and/or regulators may ensure that voltage levels do not exceed desired amounts. Control circuits and/or charging inputs may operate disconnection inputs and/or select power sources based on additional criteria.

Figure 1:
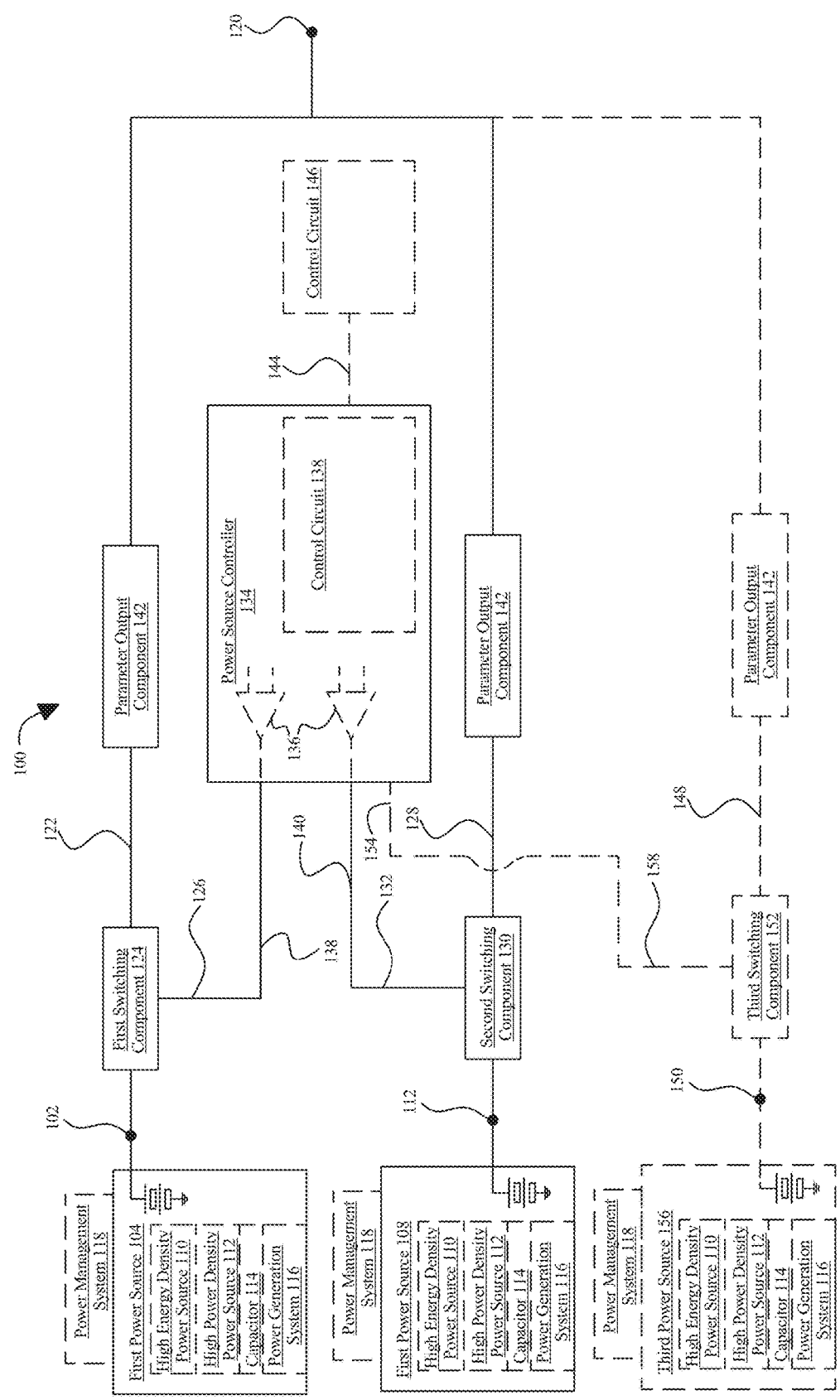
FIG. 1 is a schematic diagram illustrating an exemplary embodiment of a power path control management circuit.

Referring now to FIG. 1, an exemplary embodiment of a power path control management circuit 100 is illustrated. Circuit 100 includes a first power input terminal electrically connected to a first power source. Circuit 100 includes a second power input terminal electrically connected to a second power source.

Continuing to refer to FIG. 1, first power input terminal 102 may be connected to a first power source 104 and second power input terminal 106 may be connected to a second power source 108. As used herein, a "power source" is a device, component, or apparatus that provides electrical power to a circuit such as without limitation circuit 100. A power source may include a power storage component. A "power storage component," for the purpose of this disclosure, is a unit or module that is designed to store energy and release it when required, nature and type of power storage component may vary, and it may be characterized by its corresponding source profile. A "source profile," as described herein, refers to a set of characteristics, specifications, or performance metrics associated with power storage component within power storage component as described herein. In some cases, source profile may include, without limitation, a comprehensive overview of corresponding power storage component's capabilities, limitations, and operational parameters. In a non-limiting example, power storage component may include a battery pack, wherein the battery pack may include a plurality of battery cells, as described in detail below.

With continued reference to FIG. 1, in an embodiment, source profile may include a plurality of inherent properties of corresponding power storage component. As used in this disclosure, "inherent properties" refer to intrinsic characteristics or attributes that define limitations of corresponding power storage component. Plurality of inherent properties may be defined by one or more physical and/or chemical composition, design, construction of power storage component, among others. In some cases, plurality of inherent properties may include a plurality of electrical characteristics such as, without limitation, capacity, voltage (rate), charge (rate), efficiency, lifespan, and/or the like. Exemplary inherent properties are described in detail below.

With continued reference to FIG. 1, in a non-limiting example, source profile may include one or more profile elements describing a capacity of corresponding power storage component, for example, and without limitation, total amount of energy the power storage component may store (usually measured in watt-hours [Wh] for batteries or joules [j] for other energy storage devices.) In another non-limiting example, source profile may include one or more profile elements describing the voltage (rate) of corresponding power storage component. As a non-limiting example, source profile may include required input voltage, expected output voltage, average voltage level, operational voltage at which power storage component functions optimally, among others. In yet another non-limiting example, source profile may include one or more profile elements related to charge (rate) of corresponding power storage component. For instance, and without limitation, source profile may detail maximum and/or minimum charge rates, the optimal charge rate for maximizing battery lifespan, average charge rate, charge rate under various temperature conditions and/or the like. In yet another non-limiting example, source profile may include one or more profile elements describing efficiency, the ratio of the energy output to the energy input, indicating how effectively the corresponding power storage component may store and release energy without significant losses. For example, and without limitation, source profile may incorporate information related to energy conversion efficiency at various charge and discharge rates, efficiency peaks or troughs across operational range of corresponding power storage component, power storage component standby efficiency, energy lost, and/or the like. In a further non-limiting example, source profile may include one or more profile elements related to the lifespan of corresponding power storage component, e.g., expected operational life or corresponding power storage component (often measure in charge/discharge cycles or years). In a non-limiting example, source profile for a lithium-ion battery may specify an expected operational life of 1,000 charge/discharge cycles before the battery's capacity diminishes to 80% of its original capacity.

With continued reference to FIG. 1, in another embodiment, source profile may include at least one corresponding behavioral trait. As used in this disclosure, a "behavioral trait" is an observable and predictable responses or actions of power storage component under various conditions or stimuli. In some cases, behavioral trait within source profile, unlike inherent properties as described above, may be influenced by external factors and/or may vary based on different operating environment, usage patterns of circuit 100 and/or a system that incorporates circuit 100, and/or the like. In a non-limiting example, source profile may include one or more profile elements related to response to load variations i.e., how corresponding power storage component may react to a sudden increase or decreases (e.g., voltage sag or surge) caused by changes in external load demand during transition between different power storage components as described in detail below. For instance, lithium-ion battery may exhibit a brief voltage drop when transitioning from a low-demand state to a high-demand stage before stabilizing.

With continued reference to FIG. 1, other exemplary behavioral traits may include, without limitation, charging behaviors (i.e., the manner in which corresponding power storage component accepts energy during the charging process, including charging efficiency, heat generation, and response to different charging rates), discharge curve (i.e., pattern of voltage decline as corresponding power storage component discharges that infer energy delivery consistency), thermal behavior (i.e., how corresponding power storage component manages heat during operation, including its tendency to overheat under certain conditions, cooling efficiency, and the like), self-discharge rate (i.e., rate at which corresponding power storage component loses its stored energy when not discharging power to a load), recovery time (i.e., a time taken by corresponding power storage component to return to an optimal state after a high-load event or other stress conditions), degradation pattern (i.e., the manner in which corresponding power storage component's performance diminishes over time, including capacity fade, increase in internal resistance, and the like), safety responses to potentially hazardous situations (e.g., overcharging, short-circuiting, or thermal runaway, and the like, including activation of safety mechanisms), performance adjustments based on external factors (e.g., ambient temperature or altitude), interactions with other system components as described in detail below.

With continued reference to FIG. 1, in other embodiments, source profile may include one or more profile elements described physical dimensions (e.g., the size and weight of corresponding power storage component) and compatibility (i.e., information about which charges, devices, or systems corresponding power storage component may be compatible with). In a non-limiting example, source profile for a lithium-ion battery may specify dimensions of 150 mm×65 mm×23 mm with a weight of 300 grams, indicating its suitability for compact devices. Continuing the non-limiting example, source profile may further detail that the lithium-ion battery may be compatible with certain source charger as described in detail below. As an ordinary person skilled in the art, upon reviewing the entirety of this disclosure, will be aware of various inherent properties and behavioral traits within source profile associated with the described power storage components.

With continued reference to FIG. 1, in a non-limiting example, power storage components may include a plurality of battery-based power storage components, wherein power storage component of each battery-based power storage component of the plurality of battery-based power storage components may include a (rechargeable) battery, such as, without limitation, lithium-ion, lead-acid, or nickel-metal hydride battery.

Still referring to FIG. 1, lithium-ion phosphate battery may include lithium iron phosphate ($LiFePO_4$) as cathode material, graphite as anode material, and a lithium salt in an organic solvent as electrolyte. In some cases, lithium-ion phosphate may have safer thermal and chemical stability compared to other lithium-ion chemistries. Lithium-ion phosphate battery may be associated with profile elements related to one or more factors including, without limitation, "low cost," "high safety," "low toxicity," "long cycle life," and/or the like. Additionally, or alternatively, lithium-ion phosphate battery may be considered more environmentally friendly than other lithium-ion batteries due to the absence of heavy metals and their inherent safety features. Source Profile associated with lithium-ion phosphate battery is described in detail below.

Still referring to FIG. 1, lithium-ion phosphate battery may include a nominal voltage around 3.2V to 3.3V per cell. Lithium-ion phosphate battery may include a charge cut-off voltage around 3.65V per cell. Lithium-ion phosphate battery may include a discharge cut-off voltage around 2.5V per cell.

Still referring to FIG. 1, lithium-ion phosphate battery may include specific energy density (Wh/kg) ranges from 90 to 120 Wh/kg. Lithium-ion phosphate battery may include energy density (Wh/L) ranges from 250 to 330 Wh/L.

Still referring to FIG. 1, lithium-ion phosphate battery may achieve over 2,000 charge/discharge cycles before reaching 80% of the original capacity of the battery. In some cases, lithium-ion phosphate battery may reach up to 10,000 charge/discharge cycles with high-quality cells.

Still referring to FIG. 1, lithium-ion phosphate battery may include an operating temperature ranges from −20° C. to 60°C, with optimal performance between 0° ° C. and 45° C. Lithium-ion phosphate battery may include a storage temperature ranges from −40° ° C. to 60°C, with reduced degradation when stored at cooler temperatures.

Still referring to FIG. 1, lithium-ion phosphate battery may include a standard charge rate at 0.5C~1C. Lithium-ion phosphate battery may include a fast charge rate up to 3C for partial cells. Lithium-ion phosphate battery may include a maximum discharge rate up to 3C with some high-performance cells allowing for higher discharge rates. In some cases, lithium-ion phosphate battery may include a self-discharge rate of less than 3%/month.

Still referring to FIG. 1, lithium-ion phosphate battery may have a higher thermal stability compared to other lithium-ion chemistries, reducing the risk of thermal runaway. Lithium-ion phosphate battery may include a better tolerance to overcharging conditions without compromising safety compared to other batteries as described herein.

Still referring to FIG. 1, lithium-ion phosphate battery may include an internal resistance that varies based on specific design and size of the cell. In some cases, internal resistance of lithium-ion phosphate battery may range from 10 mΩ to 50 mΩ.

With continued reference to FIG. 1 a power storage component may include a lithium-titanate battery, and/or Lithium titanate ($Li_4Ti_5O_{12}$) as anode material, lithium manganese oxide ($LiMn_2O_4$) or lithium iron phosphate as cathode material. Electrolyte of the lithium-titanate battery may include a lithium salt in an organic solvent. Lithium-titanate battery may be associated with profile elements related to one or more factors including, without limitation, "exceptional cycle life," "rapid charge/discharge," "enhanced safety," and/or the like. Source Profile associated with lithium-titanate battery is described in detail below.

Still referring to FIG. 1, lithium-titanate battery may include a nominal voltage around 2.4 per cell. Lithium-titanate battery may include a charge cut-off voltage around 2.85V per cell. Lithium-titanate battery may include a discharge cut-off voltage around 1.5V per cell.

Still referring to FIG. 1, lithium-titanate battery may include a much lower energy density compared to lithium-ion phosphate battery as described above. Lithium-titanate battery may include a specific energy density (Wh/kg) ranging from 50 to 80 Wh/kg. Lithium-titanate battery may include energy density (Wh/L) ranges from 100 to 150 Wh/L.

Still referring to FIG. 1, lithium-titanate battery may achieve over 10,000 charge/discharge cycles with come cells even reaching up to 20,000 charge/discharge cycles or more. Lithium-titanate battery may include an operating temperature range from −30° C. to 75° C., with optimal performance between −10° C. and 60° C. Lithium-titanate battery may include a storage temperature ranges from −40° ° C. to 60° C.

Still referring to FIG. 1, lithium-titanate battery may include a standard charge rate at 1C. Lithium-titanate battery may include a fast charge rate up to 10C or even higher for some specialized cells. Lithium-titanate battery may include a maximum discharge rate up to 10C with some high-performance cells allowing for even higher discharge rates. In some cases, lithium-titanate battery may include a self-discharge rate of less than 3%/month.

Still referring to FIG. 1, due to lithium-titanate battery's unique anode material, lithium-titanate may have an even higher thermal stability compared to lithium-ion phosphate battery and other lithium-ion chemistries as described above since lithium-titanate operates at a lower operating voltage and includes an added layer of safety during rapid charging or discharging. Additionally, or alternatively, lithium-titanate battery may be less prone to the formation of lithium dendrites (i.e., tiny needle-like structures that can grow inside the battery and cause short circuits) compared to lithium-ion phosphate battery.

Still referring to FIG. 1, lithium-titanate battery may include a much lower internal resistance that varies based on specific design and size of the cell compared to lithium-ion phosphate battery, wherein the internal resistance of lithium-titanate battery may range from 1 mΩ to 5 mΩ.

With continued reference to FIG. 1, lithium-titanate battery may be paired with a source charger having a nominal voltage of around 2.4V per cell (charging voltage may range from 2.7V to 2.85V per cell). In some cases, since lithium-titanate battery supports very high charge rates (up to 5C or even higher) e.g., a lithium-titanate battery with a capacity of 10Ah may be charged at 50A, a CC followed by a CV charging may be employed by corresponding source charger to rapidly charge the lithium-titanate battery.

With continued reference to FIG. 1, at least one of first power source 104 and second power source 108 may include a capacitor 114. A "capacitor," as used in this disclosure, is a passive electronic device that stores electrical energy in an electric field by accumulating electric charges on two closely spaced surfaces that are insulated from each other. A capacitor 114 may include a supercapacitor (SC). In a non-limiting example, supercapacitor may implement a physical separation of electrical charges, specifically through electrostatic double-layer capacitance and, in some cases, pseudocapacitance. Supercapacitor may include two electrodes separated by an ion-permeable membrane (separator), and an electrolyte ionically connecting both electrodes. When electrodes are polarized by an applied voltage, from source charger, ions in electrolyte may form electric double-layers of opposite polarity to electrodes' polarity. For example, and without limitation, positively polarized electrodes may have a layer of negative ions at the electrode/electrolyte interface along with a charge-balancing layer of positive ions adsorbing onto the negative layer (the opposite is true for the negatively polarized electrode). Additionally, depending on electrode material and surface shape, some ions may permeate double layer becoming specifically absorbed ions and contribute with pseudocapacitance to the total capacitance of supercapacitor as described herein. Source profile associated with supercapacitor is described in detail below.

At least one of first power source 104 and second power source 108 may include a high energy density power source 110. As used herein, an energy source device has high energy density where the total electrical energy it can usefully produce per unit of volume and/or mass is relatively high. First high energy density energy source 108 may include a device for which total energy that may be extracted per unit of volume and/or mass has been optimized, at the expense of the maximal rate of energy extraction, during design, as indicated for instance with regard to Peukert's Law. Non-limiting examples of items that may be used as first high energy density power source 110 include without limitation those used in the automotive and energy storage applications, such as lead acid and lead acid absorbed glass mat batteries (AGM) including spiral wound and flat plate AGM batteries. Nickel based chemistries such as nickel cadmium or nickel metal hydride used in consumer electronics and hybrid automobiles. Lithium ion battery chemistries may also be high energy density energy sources, including those termed Nickel Cobalt Aluminum (NCA), Nickel Manganese Cobalt (NMC), Lithium Iron Phosphate (LiFePO$_4$) and Lithium cobalt oxide (LCO) which describe the chemistry of the cathode material in the battery; common cells used in applications today in the 18650 format may include NCA and NMC for automotive applications which may have greater than 100 Wh/kg. Multiple valent chemistries currently in development can also provide high energy density include magnesium (Mg) ion, sodium (Na) ion or other multivalent species. Li polymer batteries may also be high energy density. Fuel cells may be used as high energy sources and may include, without limitation, hydrogen fuel cells, direct methanol fuel cells and solid oxide fuel cells.

At least one of first power source 104 and second power source 108 may include a high power density power source 112. As used herein, an energy source device has high power density where the electrical power, defined as the rate of electrical energy per unit time, can usefully produce per unit of volume and/or mass is relatively high. A high power density energy source may include a device for which power that may be produced per unit of volume and/or mass has been optimized, at the expense of the maximal total energy extraction, during design, as indicated for instance with regard to Peukert's Law. Non-limiting examples of items that may be used as a high power density energy source include batteries used for starting applications including lead acid chemistries, such as flooded lead acid batteries, widely used in the majority of automobiles or any propelling or drivable vehicle with an internal combustion engine, Li ion batteries which may include NCA, NMC, Lithium iron phosphate (LiFePO$_4$) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanate anode.

With continued reference to FIG. 1, power storage components used for first power source 104, second power source 108, and/or additional power sources may be selected in a plurality of combinations of power sources with or without distinct source types to carter to diverse operational requirements and environmental conditions. In an embodiment, power storage components may include a "High Energy+High Power+Fast Response" combination, wherein such power source combination may include an integration of a lithium-ion (LiCoO$_2$ or NMC) battery (known for high energy density, suitable for prolong energy supply), a nickel-metal hydride (NiMH) battery (offers a balance between energy and power, often sued in hybrid vehicles), and a graphene supercapacitor (known for extremely fast charge/discharge rates and high power delivery.

Still referring to FIG. 1, in another embodiment, power storage components may include a "Stability+Fast Charge+Longevity" combination, wherein such power source combination may include an integration of a lithium-iron Phosphate battery (recognized for its stability and safety as described above), a lithium-titanate battery (known for fast charging capabilities and long cycle life as described above), and a carbon-based supercapacitor (offers rapid charge/discharge rates).

Still referring to FIG. 1, in yet another embodiment, power storage components may also include a "Low Temperature+High Power+Fast Response" combination, wherein such power source combination may include an integration of a lithium-nickel cobalt aluminum oxide (LiHiCoAlO$_2$) battery (offers good performance at lower temperatures), a nickel-cadmium (NiCd) battery (known for high power delivery, especially in colder conditions), and a pseudocapacitor (combines battery-like energy storage with supercapacitor-like fast charge/discharge).

Still referring to FIG. 1, in yet another embodiment, power storage components may also include an "Economical+Sustainable+Fast Response" combination, wherein such power source combination may include an integration of a lead-acid battery (an economical technology with moderate energy density), a sodium-ion battery (having abundant sodium as an alternative to lithium, offering sustainability), and a hybrid supercapacitor (combines characteristics of traditional capacitors and batteries, offering moderate energy storage with fast response times.

Still referring to FIG. 1, in a further embodiment, power storage components may include a "High Temperature+Longevity+Fast Response" combination, wherein such power source combination may include an integration of a sodium-sulfur (NaS) battery (operates at high temperatures and offers good energy density), a lithium-manganese oxide (LiMn$_2$O$_4$ or LMO) battery (known for stability at higher temperatures and decent lifespan), and an organic supercapacitor (uses organic electrolytes and operates at varying temperatures with fast response times).

Further referring to FIG. 1, at least one of first power source 104 and second power source 108 may include a power generation system 118. A "power generation system 118," as used in this disclosure, is a component, system, and/or network that generates electrical power, for instance by conversion of heat, light, or kinetic energy into electrical power. A power generation system 118 may include a regional or municipal power grid, a generator such as a steam turbine or gas generator, a hydroelectric generator, a photovoltaic cell or system, a geothermal generator, a dynamo, a windmill, or any other generator that may occur to persons skilled in the art upon reviewing the entirety of this disclosure. A power generation system 118 may include and/or provide power to a "mains" electrical system or other network, which may be connected directly or indirectly to a power input terminal. In some embodiments, a power generation system 118 may also be connected to any power source described in this disclosure and/or connected to circuit 100 including first power source 104, second power source 108, and/other power sources to charge such power sources.

Continuing to refer to FIG. 1, one or more power conversion elements (not shown) may be disposed between power sources and power input terminals and/or at some point in a power conduit. Power conversion elements may include components that convert alternating current (AC) power to direct current (DC) power, or vice-versa; such components may include full or half-wave rectifiers, inverters, or the like. Power conversion elements may include one or more voltage level converters such as buck or boost converters, transformers, Zener diodes, linear power sources, or the like. Power conversion elements may include one or more smoothing or regulating elements such as capacitors. Persons skilled in the art, having the benefit of the entirety of this disclosure, will be aware of various elements and/or components that may be used as power conversion elements as used herein.

Still referring to FIG. 1, at least one of first power source 104 and second power source 108 may include a power source management system of at least one of the first power source 104 and the second power source 108. As used in this disclosure, a "power management system" is a system, component, and/or module that is integrated in or communicatively connected to a power source and regulates or monitors the corresponding power source, where monitoring and/or regulation may include monitoring and/or regulation of electrical parameters such as voltage, current, impedance or the like, monitoring and/or regulation of physical parameters such as overall or localized temperature, moisture, pressure, and the like, or any other regulation and/or monitoring that may occur to persons skilled in the art upon reviewing the entirety of this disclosure.

With further reference to FIG. 1, a power management system may include, as a non-limiting example, a battery management and balancing module. As used in this disclosure, a "Battery Management and Balancing Module" is a system of a sub-system designed to oversee and optimize the operation of individual units (e.g., cells) within connected power source 104 (e.g., a battery pack). In an embodiment, BMBM may include an electronic system that manages a rechargeable battery such as any battery as described above. In some cases, BMBM may include a processing circuit and/or any computing device as described herein configured to execute predefined tasks or operations related to battery management and balancing, as described in detail below. In some cases, processing circuit may be communicatively connected to a memory.

With continued reference to FIG. 1, BMBM may also include a sensor communicatively connected to processing circuit as described above within each power storage component. BMBM may integrate a plurality of sensors configured to detect a power source datum. As used in this disclosure, "power source datum" refers to a specific piece of information or a set of data points related to at least a power source within power storage components In some cases, power source datum may include various metrics or values describing current condition, capacity, efficiency, or any other relevant parameters of power source. In an embodiment, one or more power source datums may be produced based on BMBM's state monitoring. Such power source datums may be related to state of charge (SoC) i.e., the current battery capacity as a percentage of its maximum capacity, state of health (SoH) i.e., the overall condition of the battery indicated by battery's current capacity relative to its original capacity, and/or state of function (SoF) i.e., the ability of battery to deliver the required function considering both SoC and SoH as described herein. In a non-limiting example, power source datum may include voltage level, current flow, temperature, internal resistance, cycle count, usage time, operational status, energy capacity, and/or the like, determined based one or more readings/signals from various sensors and/or other inputs.

With continued reference to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal and the like. In some cases, a signal may be used to communicate with a computing device, for example by way of one or more ports. In some cases, a signal may be transmitted and/or received by sensor, processing circuit, and/or any other computing device as described herein, for example by way of an input/output port.

With continued reference to FIG. 1, in some cases, plurality of sensors may be in the form of individual sensors or a sensor suite working in tandem or individually. A sensor suite may include a plurality of independent sensors, as described herein, where any number of the described sensors may be used to detect any number of physical or electrical quantities associated with corresponding power source or power storage component. Independent sensors may include separate sensors measuring physical or electrical quantities that may be powered by and/or in communication with circuit independently, where each may signal sensor output to processing circuit. In a non-limiting example, there may be four independent sensors housed in and/or on each BMBM configured to measuring temperature, electrical characteristic such as voltage, amperage, resistance, or impedance, proximity, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of BMBM to detect phenomenon is maintained.

With continued reference to FIG. 1, in some cases, sensor may include electrical sensors. Electrical sensors may be configured to measure voltage across a component, electrical current through a component, and resistance of a component. Electrical sensors may include separate sensors to measure each of the previously disclosed electrical characteristics such as voltmeter, ammeter, and ohmmeter, respectively. Alternatively, or additionally, sensor may include a sensor or plurality thereof configured to detect voltage and direct the charging of individual the battery cells according to charge level; detection may be performed using any suitable component, set of components, and/or mechanism for direct or indirect measurement and/or detection of voltage levels, including without limitation comparators 136, analog to digital converters, any form of voltmeter, or the like. For instance, and without limitation, sensor may be configured to determine that a charge level of a battery cell is high based on a detected voltage level of a power source.

Still referring to FIG. 1, sensor may alternatively or additionally detect a "charge reduction event", defined for purposes of this disclosure, as any temporary or permanent state of a battery cell requiring reduction or cessation of charging; a charge reduction event may include at least a portion of power source e.g., a battery cell being fully charged and/or a cell undergoing a physical and/or electrical process that makes continued charging at a current voltage and/or current level inadvisable due to a risk that power source or at least a portion of power source will be damaged, will overheat, or the like. Detection of a charge reduction event may include detection of a temperature, of the cell above a threshold level, detection of a voltage and/or resistance level above or below a threshold, or the like.

With continued reference to FIG. 1, sensor may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor, may be measured in Fahrenheit (° F.), Celsius (° C.), Kelvin (° K), or another scale alone or in combination.

Still referring to FIG. 1, in a non-limiting example, sensor may include digital sensors, analog sensors, or a combination thereof. Sensor may include digital-to-analog converters (DAC), analog-to-digital converters (ADC, A/D, A-to- D), other signal conditioning components, or a combination thereof, used in transmission of one or more detected data points as described herein (e.g., temperature, voltage level, charge level, current level, and/or the like) to a destination such as processing circuit over wireless or wired connection by converting the detected data points into digital data that the processing circuit can process.

With continued reference to FIG. 1, processing circuit within BMBM may be configured to collect and/or report data points signaled by one or more sensors for further processing. In a non-limiting example, an analog signal may be digitized, for example by ADC. Analog signal may be processed by any analog signal processing steps as described in this disclosure, prior to digitization. Digital signal (i.e., digital data) may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, in some cases, processing circuit and/or any other computing devices as described herein may perform one or more signal processing steps on a signal. For instance, processing circuit of BMBM may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers.

Still referring to FIG. 1, in some cases, digital signal processing may be used, by processing circuit and/or any other computing devices as described herein to process digitized discrete-time sampled signals. Commonly, digital signal processing may be performed by processing circuit, a computing device, or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued, and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, sensor may also include a sensor configured to detect gas that may be emitted during or after a cell failure. "Cell failure," for the purposes of this disclosure, refers to a malfunction of a battery cell, which may be an electrochemical cell, which renders the cell inoperable for its designed function, namely providing electrical energy to at least a portion of external load as described in detail below. Byproducts of cell failure may include gaseous discharge including oxygen, hydrogen, carbon dioxide, methane, carbon monoxide, a combination thereof, or another undisclosed gas, alone or in combination.

Still referring to FIG. 1, in a non-limiting example, BMBM may include a gas detector configured to detect vent gas from electrochemical cells. For the purposes of this disclosure, a "gas detector" is a device used to detect a gas is present in an area. Gas detectors, and more specifically, the gas sensor that may be used in sensor, may be configured to detect combustible, flammable, toxic, oxygen depleted, a combination thereof, or another type of gas alone or in combination. The gas sensor that may be present in sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. Sensor may include sensors that are configured to detect non-gaseous byproducts of cell failure including, in non-limiting examples, electrical anomalies as detected by any of the previously disclosed sensors or components.

With continued reference to FIG. 1, in some cases, sensor may be configured to detect events where voltage nears an upper voltage threshold or lower voltage threshold. The upper voltage threshold may be stored in a data acquisition (and storage) system as described in detail below for comparison with an instant measurement taken by any combination of sensors present within sensor. In an embodiment, upper voltage threshold may be calculated and calibrated based on factors relating to battery cell health, maintenance history, location within battery pack, designed application, and type, among others. Sensor may measure voltage at an instant, over a period of time, or periodically. Sensor may be configured to operate at any of these detection modes, switch between modes, or simultaneous measure in more than one mode. In other cases, BMBM may detect through sensor events where voltage nears the lower voltage threshold. The lower voltage threshold may indicate power loss to or from an individual battery cell or portion of the battery pack. In an embodiment, BMBM may detect through sensor events where voltage exceeds the upper and lower voltage threshold. Events where voltage exceeds the upper and lower voltage threshold may indicate battery cell failure or electrical anomalies that could lead to potentially dangerous situations circuit 100, connected external load, and personnel that may be present in or near its operation.

With continued reference to FIG. 1, in some cases, processing circuit of BMBM may be configured to adjust charge to a power source as a function of detected parameter as described above; this may include adjustment in charge as a function of detection of a charge reduction event. Alternatively, or additionally, plurality of sensors incorporated therein and/or communicatively connected thereto may be configured to increase charge, using a charger, to a power source upon detection that a charge reduction event has ceased; for instance, plurality of sensors incorporated therein and/or communicatively connected thereto may detect that a temperature of a subject battery cell within a power source has dropped below a threshold, and may increase charge again. In some embodiments, charge may be regulate using any suitable means for regulation of voltage and/or current, including without limitation use of a voltage and/or current regulating component including one that may be electrically controlled, including without limitation any switching component as described below. Voltage and/or current to one or more power sources may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

Continuing with reference to FIG. 1, additionally, or alternatively, BMBM may implement one or more aspects of cell balancing to ensure that all individual cells within a power source and/or power storage component maintain an equal/uniform state of charge. In an embodiment, cell balancing may address disparities in the charge levels of individual cells within a power source. In a non-limiting example, BMBM may employ an active cell balancing, wherein the "active cell balancing" transfers energy from higher charged cells, detected via through array of sensors and configured by processing circuit, to lower charged ones. In another non-limiting example, BMBM may employ a passive cell balancing, wherein the "passive cell balancing" dissipates excess energy from higher charged cells using one or more resistors as described above. As an ordinary person skilled in the art, upon reviewing the entirety of this disclosure, will appreciate the importance of maintaining uniformity in cell charge levels to optimize battery performance, extend battery life, and ensure safety. The described methods of cell balancing, both active and passive, serves as mechanisms within a system to ensure power storage components operate within their optimal parameters to deliver the most desirable performance in terms of power output and efficiency.

With continued reference to FIG. 1, circuit 100 includes an output terminal 120 connected to a load. As used in this disclosure, a "load" is a device, system, or otherwise component that draws power or energy from a primary source or system. In an embodiment, a load may include any electrical appliance, machinery, or component that consumes electrical energy supplied by any power source as described herein, such as, without limitation, a battery, generator, or electrical grid. In a non-limiting example, a load may include simple devices such as one or more light bulbs and/or fans. In another non-limiting example, a load may include complex systems such as industrial machinery, computers, or electric vehicles. A load may determine the amount of current drawn from connected power source, and its electrical characteristics, such as, without limitation, resistance, inductance, and capacitance may include the behavior and performance of the power source as described herein. Embodiments of loads may include, without limitation, any embodiments of external loads as described in U.S. application Ser. No. 18/389,473, filed on Nov. 14, 2023 and entitled "HYBRID POWER SYSTEM AND METHODS OF USE," the entirety of which is incorporated by reference in this disclosure.

Still referring to FIG. 1, circuit 100 includes a first power conduit 122. A "power conduit," as used in this disclosure, is a conductive path from an input terminal to an output terminal 120 through which electrical power may flow from a power source to a load that consumes electrical power. First power conduit 122 includes a first switching component 124 connecting the first power input terminal 102 to the output terminal 120. A "switching component," a used in this disclosure, is an electrically controllable circuit element that permits conduction through it from an input terminal to an output terminal 120, or in this case from first power input to power output. First switching component 124 may have an "on" or conducting state in which electrical current is able to conduct across or through first switching component 124, and in which electrical current is able to pass from first input terminal to output terminal 120, and an "off" or non-conducting state in which electrical current is either entirely absent or negligible; for instance, current may be limited to a "leakage current" on the order of approximately 1-10 µA or less, and several orders of magnitude lower than current through the switching component when it is in the conducting state. First switching component 124 has a first control terminal 126, where a "control terminal" is an electrical terminal, contact, or wire at which a voltage and/or current may be applied to convert first switching element from an "on" or conducting state to an "off" or non-conducting state, or vice-versa; first switching component 124 may have a single control terminal or a plurality of control terminals, and electrical parameters thereat to effect changes of state may involve voltage differences between control terminals and input and/or output terminals 120 of first switching component 124, currents between control terminals, input terminals and/or output terminals 120, or other electrical parameters at or across any such terminals. First switching component 124 may include a transistor. First switching component 124 may include a field effect transistor, which may include without limitation a metal oxide semiconductor field-effect transistor (MOSFET) or junction field-effect transistor (JFET). First switching component 124 may include a bipolar junction transistor (BJT). First switching component 124 may include a thyristor such as a gate turn-off thyristor, a TRIAC, or other electrical switching device. First switching component 124 may include a non-semiconductor transistor, thyristor, or other switching device. First control terminal 126 may include, without limitation, a gate of a MOSFET or thyristor, a base of a BJT, or the like.

With continued reference to FIG. 1, circuit 100 includes a second power conduit 128. Second power conduit 128 includes a second switching component 130 connecting the second power input terminal 106 to the output terminal 120. Second switching component 130 may be implemented in any manner suitable for implementation of first switching component 124. Second switching component 130 includes a second control terminal 132, which may include any control terminal as defined and described above.

Still referring to FIG. 1, at least a power source controller 134. Power source controller 134 may be any component that detects an electrical parameter of first power conduit 122, second power conduit 128, and/or a third or additional power conduit, and modifies an electrical parameter at first control terminal 126, second control terminal 132, and/or third or additional control terminals, to convert a state of a switching component. At least a power source controller 134 is communicatively connected to the first switching component 124 and the second switching component 130. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. At least a power source controller 134 includes a first signal terminal 138 electrically connected to first control terminal 126. At least a power controller includes a second signal terminal 140 electrically connected to the second control terminal 132.

Further referring to FIG. 1, at least a power controller may include a separate power controller connected to and interacting with each power conduit described in this disclosure, may include one or more components that interact with and/or control two or more power conduits simultaneously, or may include a single component that controls and/or interacts with all power conduits. First signal terminal 138 and/or second signal terminal 140, in other words, may be terminals of two distinct devices and/or may be terminals of a single device.

With continued reference to FIG. 1, at least a power source controller 134 is configured to detect a reverse current condition in first power conduit 122 and switch off the first switching component 124 using the first signal terminal 138. A "reverse current condition," as used in this disclosure, is a condition of a circuit or circuit element in which current may flow in the reverse direction, or in other words back into first power source. A reverse current condition may exist where an output or load side of a switching element and/or power conduit is at a higher voltage than a power source side thereof. At least a power source controller 134 may be configured to detect a reverse current condition in second power conduit 128 and switch off the second switching component 130 using the first signal terminal 138. At least a power source controller 134 may be configured to detect a reverse current condition in one or more third or additional power conduits and switch off one or more third or additional switching components using one or more third or additional control terminals; alternatively or additionally, at least a power source controller 134 may be configured to switch one or more switching components and/or power conduits upon detection of one or more electrical parameters. Furthermore, at least a power source controller 134 may be configured to switch off or on power conduits based on electrical parameters and/or external commands, which may include any parameters and/or commands that may occur to a person skilled in the art upon reviewing the entirety of this disclosure. At least a power source controller 134 may include any analog or digital control circuit 146, including without limitation an operational amplifier circuit, a combinational or sequential digital circuit, an application-specific integrated circuit (ASIC), or the like. At least a power source controller 134 may include an "ideal diode" controller, such as without limitation an LTC4372 or LTC 4373 low quiescent current ideal diode controller as produced by Analog Devices of Wilmington, Massachusetts. At least a power source controller 134 includes at least a comparator 136 configured to compare an electrical parameter of the first power path to an electrical parameter of the second power path and detect the current as a function of the comparison. A "comparator 136" for the purposes of this disclosure is an electronic device that inputs two or more input voltages and outputs a first "high," logic 1, positive rail, or other voltage upon a first input voltage exceeding a second input voltage, and outputs a second "low," logic 0, negative rail or other voltage contrasting with the first output voltage when the second input voltage exceeds the first input voltage; comparator 136 may include an operational amplifier comparator 136, a digital comparator 136, or any other comparator 136 that may occur to persons skilled in the art upon reviewing the entirety of this disclosure.

Still referring to FIG. 1, at least a power source controller 134 may include a computing device, which may include any computing device as described in this disclosure. Computing device includes a processor communicatively connected to a memory. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, at least a power source controller 134 may be configured to select a power conduit of the first power conduit 122 and the second power conduit 128 and disconnect the power conduit of the first power conduit 122 and the second power conduit 128 that is not selected. Selection may be performed, without limitation, in any way as described below for a control circuit 146.

Continuing to refer to FIG. 1, circuit 100 includes at least a parameter output component 142. At least a parameter output component 142 may include any component configured to transmit a measured electrical parameter to an exterior component, device, apparatus, and/or system via a communicative connection. At least a parameter output component 142 is configured to output at least an electrical parameter from the circuit to an exterior meter, wherein the exterior meter is communicatively couple to at least one of the first power source 104 and the second power source 108. At least a parameter output component 142 may include any sensor or other device configured to measure one or more electrical parameters directly or indirectly, including without limitation an ammeter, ohmmeter, voltmeter, an inductance meter, a capacitance meter, or the like. At least a parameter output component 142 may include a first shunt, for instance as described and depicted below, electrically connected to at least one of first power conduit 122 and second power conduit 128. As used in this disclosure, a "shunt" is a low-resistance device used to create a known current-to-voltage relationship in an electrical circuit. In some cases, a shunt may be placed in parallel with an instrument or component e.g., at least one power source controller 134 as described herein, allowing most of the current to flow through the shunt while a known fraction passes through another device, thereby enabling a measurement of high currents by observing a voltage drop across shunt, which may then be scaled to infer the current through a power conduit (i.e., a power path or a section of power path that is directly connected to external load). In a non-limiting example, shunt may measure a voltage drop across it, the current flowing through the circuit may be then determined using Ohm's law. Exemplary embodiments of shunt may include, without limitation, resistive shunt, magnetic shunt, electronic shunt, Hall Effect shunt, and/or the like. As an ordinary person skilled in the art, upon reviewing the entirety of this disclosure, will be aware of various shunts system 100 may implement for data monitoring and component protection purposes as described herein. At least a parameter output component 142 may include a current sensor. At least a parameter output component 142 may be communicatively connected to a power source management system of at least one of first power source 104 and second power source 108; in an embodiment, power source management system may be configured to perform one or more actions and/or adjustments based on parameters sensed in at least a parameter output component 142, such as measuring a current output from a corresponding power source and determining an output impedance, permitting power source to impedance match or otherwise calibrate output parameters of the power source. Alternatively or additionally, at least a parameter output component 142 may be configured to output electrical parameters and/or data derived therefrom at a display (not shown) or to another device.

Still referring to FIG. 1, in some embodiments, circuit 100 may include a disconnect input 144. Disconnect input 144 may be implemented in any manner as described above for communicative connection, control terminals, signal terminals, parameter output component, or the like. Circuit 100 may be configured to receive a disconnect signal at disconnect input 144, where a "disconnect signal" is a command to disconnect one or more power conduits such as without limitation first power conduit 122, second power conduit 128, and/or other power conduits described in this disclosure. Circuit 100 may be configured to disconnect at least one of the first power conduit 122 and the second power conduit 128, all power conduits including first power conduit 122 and second power conduit 128 and/or a third or other power conduit, and/or all power conduits except a selected power conduit, as a function of and/or because of receiving a disconnect signal. Disconnection may be performed by way of power source controller 134, which may include, for instance, a disconnection or power-off input. In some embodiments, power source controller 134 may be configured to switch off first switching component 124, second switching component 130, and/or a third or other switching component by signaling a control terminal, via a signal terminal, to switch such switching component and/or components off.

With continued reference to FIG. 1, disconnect signal may be received from and/or generated by any external or internal device to circuit 100. Disconnect signal may include and/or represent an indication that at least one of first power source 104 and second power source 108, or any third or additional power source, is charging; such an indication may be received, without limitation from a charging circuit and/or a power management system. In an embodiment, disconnect signal may ensure that a power conduit from a source that is charging is closed and thus unable to conduct to and/or from the power source. In some embodiments, a power conduit from a non-charging source may be kept open; this may enable circuit 100 to continue providing power to load while one or more sources are charging.

Still referring to FIG. 1, circuit 100 may include and/or communicate with a control circuit 146. Control circuit 146 may be implemented in any manner described above for power source controller 134, including using an analog or digital circuit, including without limitation operational amplifier circuits, combinatorial and/or sequential logic circuits, processors, microcontrollers, any form of computing device, or the like. Control circuit 146 may be communicatively connected in any manner described in this disclosure with any element, system, circuit, and/or component described in this disclosure.

With further reference to FIG. 1, control circuit 146 may be designed and/or configured to perform any method, method step, or sequence of method steps in any embodiment described in this disclosure, in any order and with any degree of repetition. For instance, control circuit 146 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Control circuit 146 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In some embodiments, and with continued reference to FIG. 1, control circuit 146 may be configured to generate disconnect signal, which may alternatively or additionally be referred to as a "selection signal," used to select a power source to provide power to a load. For instance, and without limitation, control circuit 146 may be configured to determine a load usage of a load connected to the output terminal 120 and generate the disconnect signal as a function of the load usage. A "load usage" as used in this disclosure is an action or process being performed at a load, including without limitation an output of light, display, sound, kinetic energy, or the like, and/or an electrical parameter such as a current or voltage required by such output. A load usage may include a current load usage and/or a future load usage. For instance, a load usage may include operation of a vehicle motor to accelerate, decelerate, increase or decrease power or torque, or otherwise change, increase, or decrease a power demand. In some embodiments a load usage may be detected and/or transmitted at a load; for instance and without limitation, a user or automated system may command a load such as a vehicle motor to increase or decrease power consumption either directly or by commanding performance of a task that causes increase or decrease in power consumption, any version of which command may be signaled to control circuit 146. Alternatively or additionally, control circuit 146 may generate such commands and/or predict generation of such commands and/or of load usages. As a further non-limiting example, control circuit 146 may be configured to determine a load type of a load connected to the output terminal 120 and generate the disconnect signal as a function of the load type. A "load type," as used in this disclosure, is a category or characteristic of a load. For instance, a load type may specify that the load is a motor, a display, a light source, an instrument, a medical device, or the like. In some embodiments, and without limitation, one load type such as a vehicle motor may require larger amounts of instantaneous power, while another load type may have lower power demands; in this case, a power source with higher power density might be initially selected for the first load type, while such selection may be unnecessary for the second load type. As another example, a load type such as an instrument or oscilloscope may be very sensitive to noise in the power signal, such as a ripple introduced by a rectified AC power signal or a signal converted using a switching conversion circuit, which may cause control circuit 146 to select a power source with a "cleaner" or more steady DC signal profile. As an additional non-limiting example, control circuit 146 may be configured to determine a power source type of at least one of the first power source 104 and the second power source 108 and generate the disconnect signal as a function of the power source type. For instance, where one power source is connected and/or is a power generation system 118, that power source may be chosen preferentially over a power storage device; as another example, a power source with high power density may be kept in reserve in situations where a lower power density source can provide sufficient power, because that increases the future potential power capability of the overall system. In a further non-limiting example, control circuit 146 may be configured to receive a load feedback signal from a load connected to the output terminal 120 and generate the disconnect signal as a function of the load feedback signal. For instance, a load may transmit an indication that it has received a command, and control circuit 146 may select a different circuit as a result of the indication. As an additional non-limiting example, control circuit 146 may be configured to receive a load feedback signal from a load connected to the output terminal 120 and disconnect both the first power conduit 122 and the second power conduit 128 as a function of the load feedback signal. Control circuit 146 may generate and/or receive one or more power optimization and/or load optimization commands and transmit disconnect signals and/or change states of switching components based on such power optimization and/or load optimization commands. Generations of disconnect signals and/or other signals to switch on or off any power source may be implemented, without limitation, as described in U.S. application Ser. No. 18/389,473.

Still referring to FIG. 1, control circuit 146 may alternatively or additionally be integrated in at least a power source controller 134. At least a power source controller 134 may alternatively or additionally be configured to perform any process or process step described above for control circuit 146. Alternatively or additionally, one or more commands and/or signals described above as entered by control circuit 146 may be entered manually, for instance via a manual switch or relay, and/or may be entered from a remote device.

Continuing to refer to FIG. 1, in some embodiments circuit 100 may include at least a third power conduit 148. At least a third power conduit 148 may be implemented in any manner suitable for implementation of first power conduit 122 and/or second power conduit 128 as described above. At least a third power conduit 148 may include a plurality of power conduits and/or a plurality of elements of power conduits as described above. At least a third power conduit 148 may include at least a third input terminal 150. In some embodiments, at least a third power conduit 148 may include at least a third switching component 152 connecting the at least a third power input terminal to the output terminal 120; at least a third switching component 152 may include without limitation any switching component as described in this disclosure. At least a third switching component 152 may include at least a third control terminal. At least a power source controller 134 may be communicatively connected to the at least a third switching component 152. At least a power source controller 134 may include at least a third signal terminal 154 electrically connected to the at least a third control terminal. At least a power source controller 134 may be configured to detect a reverse current condition in at least a third switching component 152 and switch off the third switching component 152 using the third signal terminal 154 and/or control interoperation of at least a third switching component 152 as described above. Third power conduit may provide power from a third power source 156. At least a third control terminal 158 may be used to operate at least a third switching element.

Figure 2:
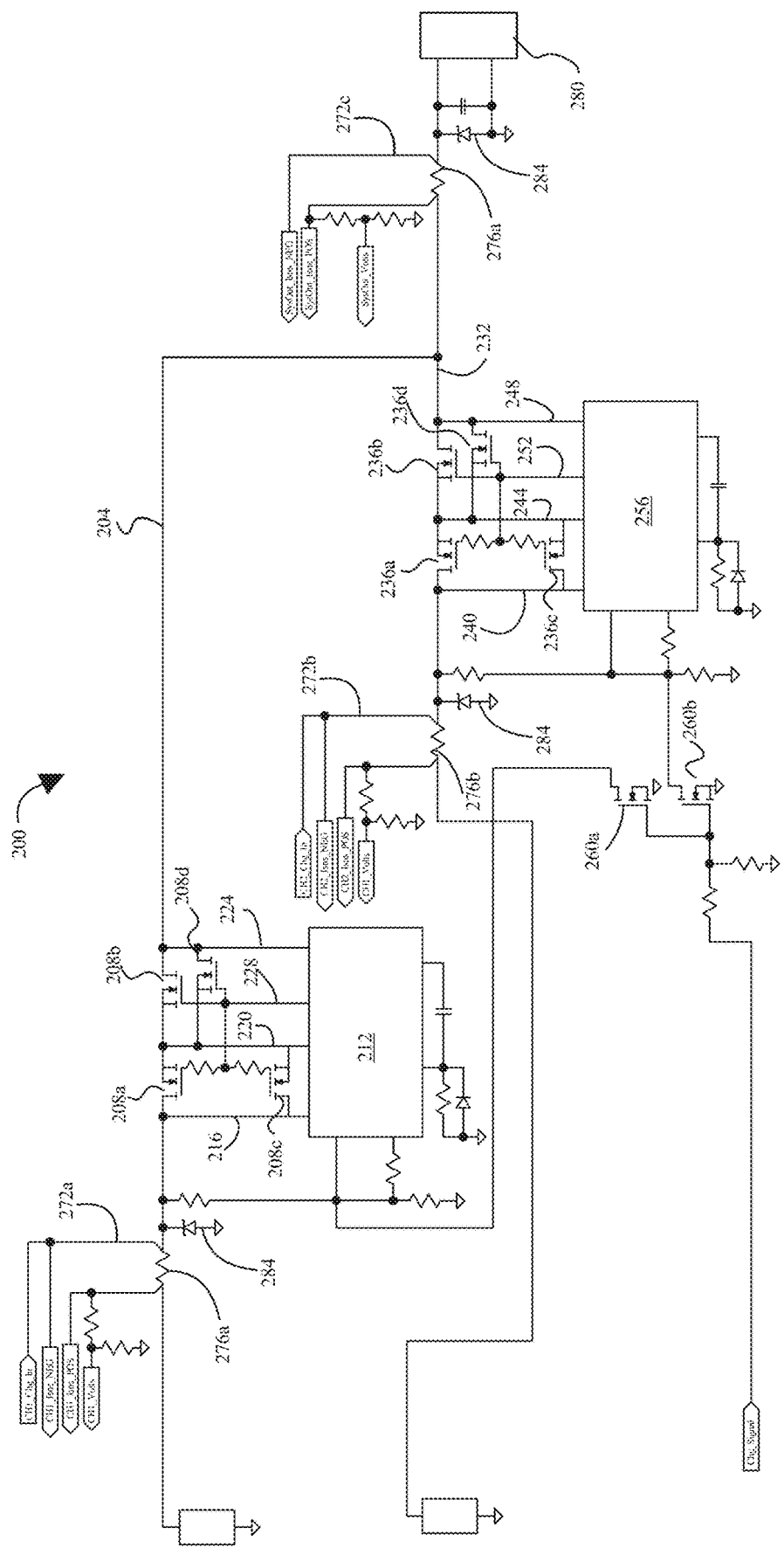
FIG. 2 is a schematic diagram illustrating an exemplary embodiment of a power path control management circuit.

Referring now to FIG. 2, an exemplary embodiment of a circuit 200 is illustrated; circuit 200 may be implemented in any manner described above for circuit 100. In an embodiment, circuit 200 includes a first power conduit 204. Current through first power conduit 204 may pass through one or more switching elements 208*a-d* operating as a switching component such as first switching component 124 as described above. One or more switching element 208*a-d* may include transistors such as MOSFETs, which may be active-high or active-low depending on signaling protocols to be used in controlling such switching elements 208*a-d*.

Still referring to FIG. 2, a power source controller 212, which may be implemented in any manner suitable for power source controller 134 as described above, may have one or more inputs measuring electrical parameters such as current and/or voltage of one or more switching elements 208 *a-d* and/or one or first power conduit 204, including without limitation an input pin 216 measuring an electrical parameter at an input to switching elements 208*a-d*, a source pin 220 measuring an electrical parameter at sources of one or more switching elements 208*a-d*, and/or an output pin 224 measuring an electrical parameter at an output of switching elements 208*a-d*. Power source controller 212 may measure and/or differences in electrical parameters across and/or between such pins, using one or more comparators as described above, one or more operational amplifier circuits, and/or one or more combinational, sequential, or processor-based logic circuits, and output a signal at a gate pin 228 to switch off switching elements 208*a-d* if measured and/or compared parameters indicate a reverse current condition as described above. For instance, and without limitation, where a voltage differential from input pin 216 to output pin 224 is negative, this may indicate a reverse-current condition; similarly, if a current is detected flowing from output pin 224 to input pin 216, this may indicate a reverse current condition.

Continuing to refer to FIG. 2, In an embodiment, circuit 200 may include a second power conduit 232 which may pass through switching elements 236*a-d*; these may be implemented as described above for switching elements 208*a-d*. An input pin 240 measuring an electrical parameter at an input to switching elements 236*a-d*, a source pin 244 measuring an electrical parameter at sources of one or more switching elements 236*a-d*, and/or an output pin 248 measuring an electrical parameter at an output of switching elements 236*a-d* may cause a shutoff or on signal at gate pin 252 from power source control 256 as described above.

Still referring to FIG. 2, a signal disconnect element 260*a-b* may include one or more input pins, switching devices, or the like, which may include any switching devices as described above. In some embodiments, activation of switching elements may draw down a signal at power source controllers 212, 256, at a pin used to detect shutoff commands; depending on signaling protocol activation and/or shutoff of such switching elements may alternatively or additionally set a signal to at power source controllers 212, 256 to a higher or logic 1 voltage. Signal to at power source controllers 212, 256 may cause then to shut off switching elements 208*a-d*, 238*a-d*. A signal to power controllers and/or signal disconnect elements 260*a-b* may be generated when one or more power sources 264, 268 are charging; alternatively or additionally, a disconnect signal may be generated as described above.

Continuing to refer to FIG. 2, circuit 200 may include one or more parameter output components, which may be implemented in any manner described above, including without limitation a first parameter output component 272*a* measuring one or more parameters such as current, voltage or the like for first power conduit 204, for instance and without limitation using a first shunt 276*a*. Similarly, a second parameter output component 272*b* may measure one or more parameters such as current, voltage or the like for second power conduit 232, for instance and without limitation using a second shunt 276*b*. A third parameter output component 272*c* may measure one or more parameters such as current, voltage or the like at an output of circuit, for instance and without limitation using a third shunt 276*c*. Output may connect to at least a load 280, which may include any load as described in this disclosure. Circuit 200 may include one or more voltage regulator elements 284, such as without limitation Zener diodes, to clamp or otherwise regulate voltage at a target level.

Figure 3:
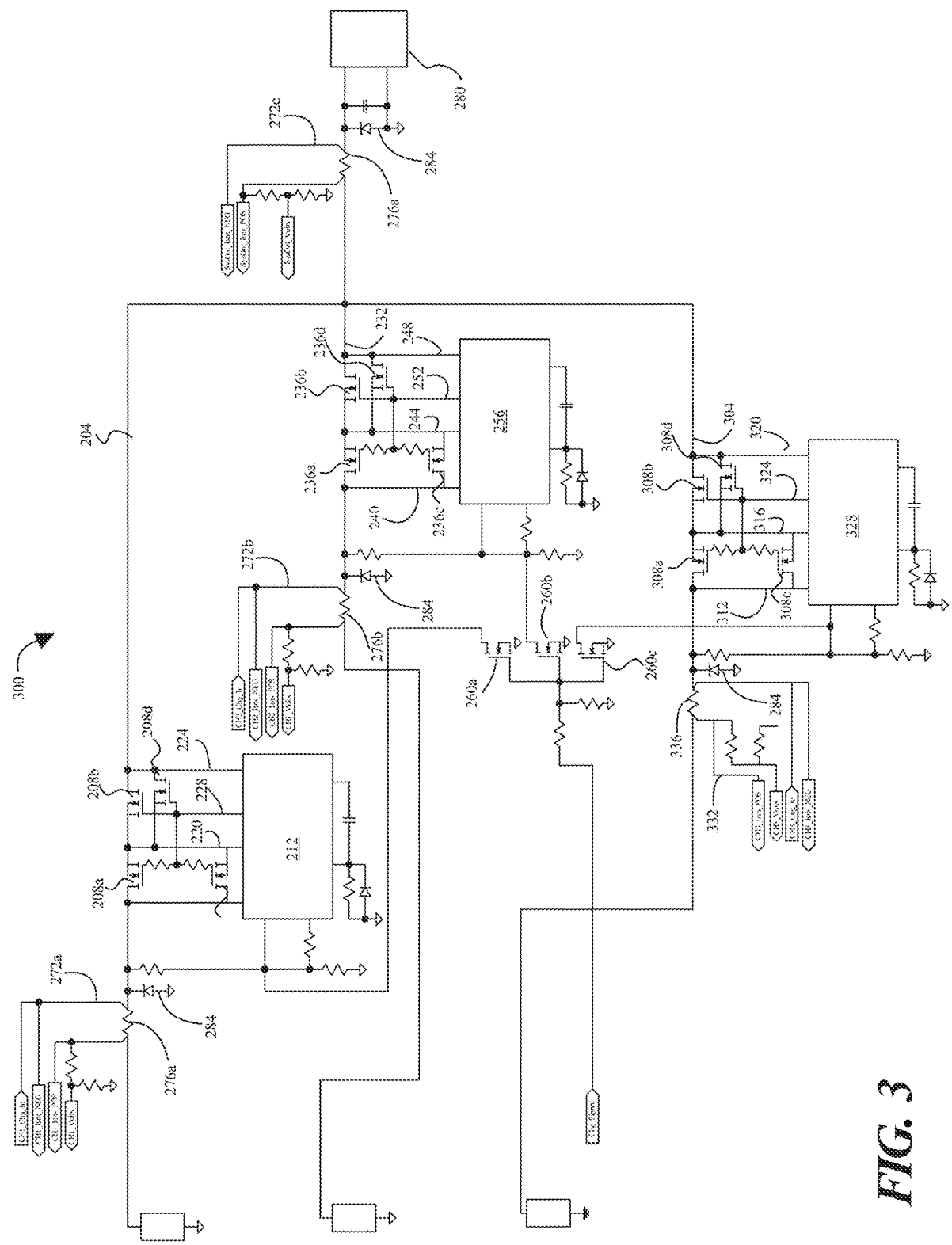
FIG. 3 is a schematic diagram illustrating an exemplary embodiment of a power path control management circuit.

Referring now to FIG. 3, an embodiment 300 of a circuit with three power conduits is illustrated for exemplary purposes. A third power conduit 304 may have one or more switching elements 308*a-d*, which may be any switching elements suitable for use as switching elements 208*a-d*. Input pin 312, source pin 316, output pin 220, and/or gate pin 224 may be implemented as above and input to a power source controller 328. A parameter output 332 may be associated with third power conduit, and may, in a non-limiting example, include a shunt 336. A third disconnect element 260*c* may be implemented in any manner suitable for first and second disconnect elements 260*a-b*.

Figure 4:
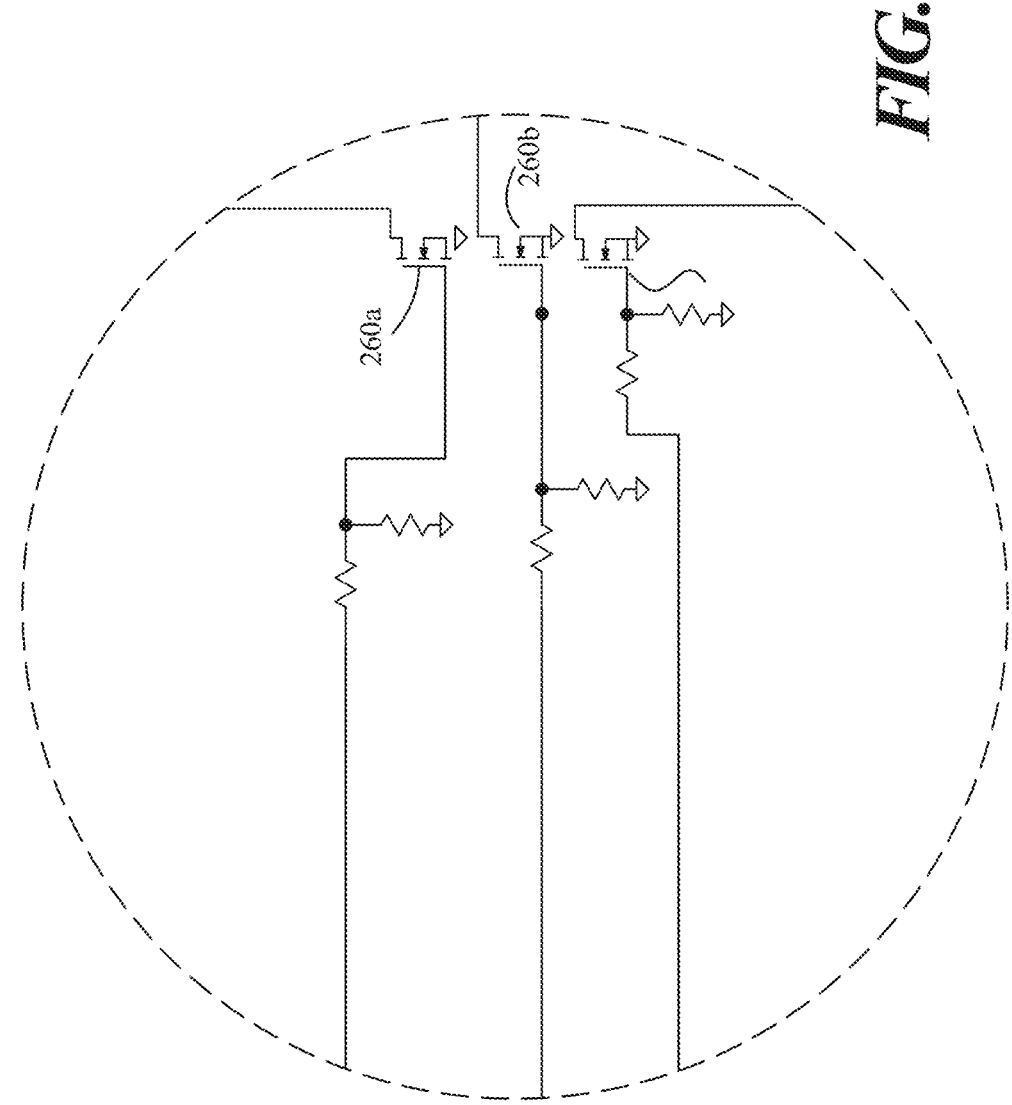
FIG. 4 is a schematic diagram illustrating an exemplary embodiment of a set of disconnect elements.

Referring now to FIG. 4, disconnect elements 400 may alternatively or additionally have separate inputs, which may be separately signaled and/or controlled by external elements, control circuit 146, or the like. Although MOSFETs are shown for the sake of illustration, any or all switching elements, signaling elements, wires, or the like may be alternatively or additionally employed.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
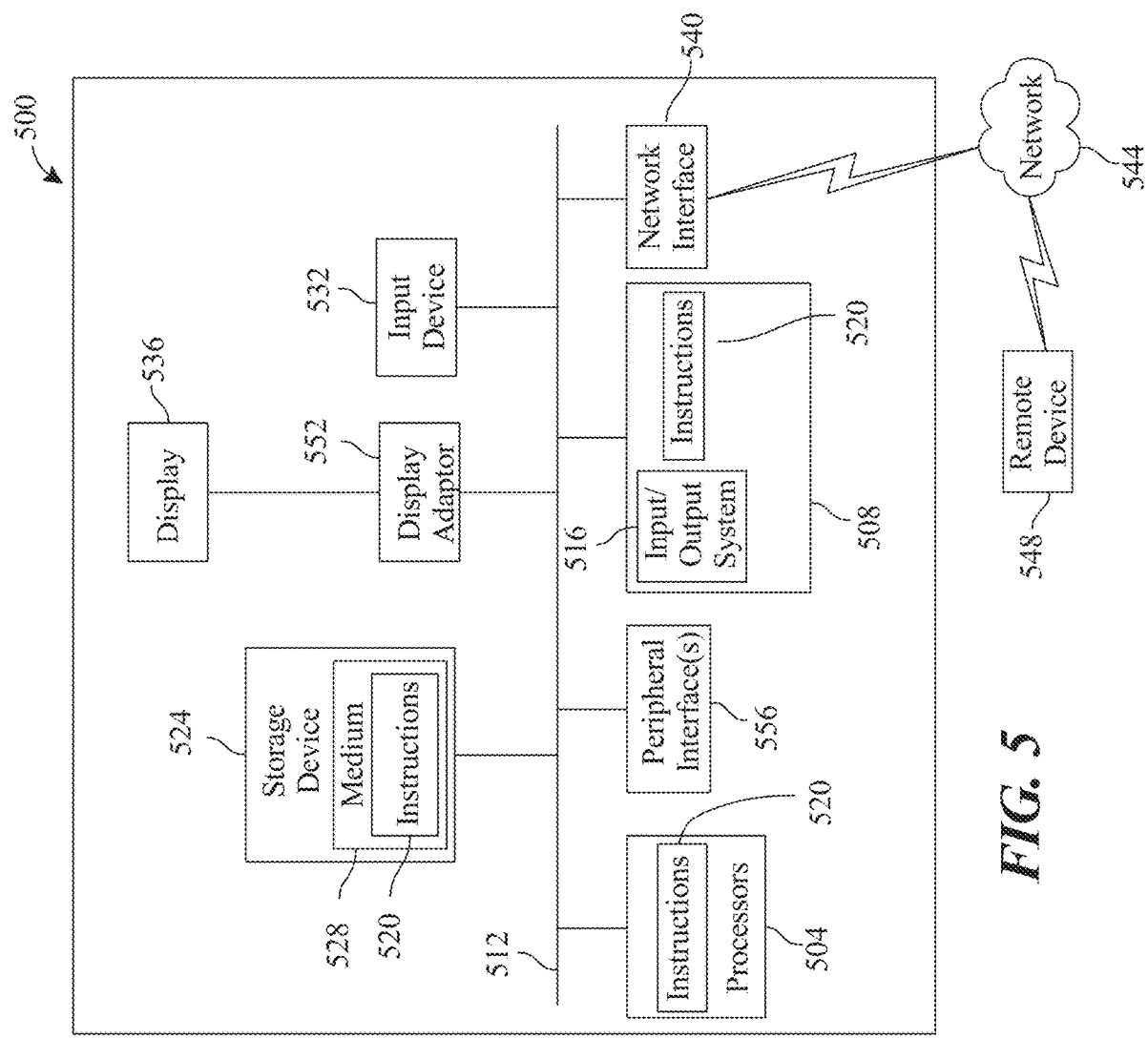
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A power path control management circuit, the circuit comprising:
    a first power input terminal electrically connected to a first power source, wherein the first power source comprises a first power management system;
    a second power input terminal electrically connected to a second power source;
    a third power input terminal electrically connected to a third power source;
    an output terminal connected to a load;
    a first power conduit, the first power conduit including a first switching component connecting the first power input terminal to the output terminal, wherein the first switching component includes a first control terminal;
    a second power conduit, the second power conduit including a second switching component connecting the second power input terminal to the output terminal, wherein the second switching component includes a second control terminal;
    a third power conduit, wherein the third power conduit including a third switching component connecting the third power input terminal to the output terminal, wherein the third switching component includes at least a third control terminal;
    at least a power source controller, wherein:
    the at least a power source controller is communicatively connected to the first switching component, the second switching component, and the third switching component;
    the at least a power source controller includes a first signal terminal electrically connected to the first control terminal, a second signal terminal electrically connected to the second control terminal, and a third signal terminal electrically connected to the third control terminal; and
    the at least a power source controller is configured to detect a reverse current condition in the first power conduit and switch off the first switching component using the first signal terminal; and
    at least a parameter output component, the at least a parameter output component configured to output at least an electrical parameter from the circuit to an exterior meter, wherein the exterior meter is communicatively coupled to at least one of the first power source, the second power source, and the third power source.

2. The circuit of claim 1 wherein at least one of the first switching component and the second switching component further comprises a field effect transistor.

3. The circuit of claim 1, wherein the a least a power source controller includes at least a comparator configured to compare an electrical parameter of the first power path to an electrical parameter of the second power path and detect the current as a function of the comparison.

4. The circuit of claim 1, wherein the at least a power source controller is further configured to:
    select a power conduit of the first power conduit and the second power conduit; and
    disconnect the power conduit of the first power conduit and the second power conduit that is not selected.

5. The circuit of claim 1, wherein the at least a parameter output component further comprises a first shunt electrically connected to at least one of the first power conduit and the second power conduit.

6. The circuit of claim 1 further comprising a disconnect input, and further configured to:
   receive a disconnect signal at the disconnect input; and
   disconnect at least one of the first power conduit and the second power conduit.

7. The circuit of claim 6, wherein the disconnect signal further comprises an indication that at least one of first power source and second power source is charging.

8. The circuit of claim 6, further comprising a control circuit configured to generate the disconnect signal.

9. The circuit of claim 8, wherein the control circuit is further configured to:
   determine a load usage of a load connected to the output terminal; and
   generate the disconnect signal as a function of the load usage.

10. The circuit of claim 8, wherein the control circuit is further configured to:
    determine a load type of a load connected to the output terminal; and
    generate the disconnect signal as a function of the load type.

11. The circuit of claim 8, wherein the control circuit is further configured to:
    determine a power source type of at least one of the first power source and the second power source; and
    generate the disconnect signal as a function of the power source type.

12. The circuit of claim 8, wherein the control circuit is further configured to:
    receive a load feedback signal from a load connected to the output terminal; and
    generate the disconnect signal as a function of the load feedback signal.

13. The circuit of claim 8, wherein the control circuit is further configured to:
    receive a load feedback signal from a load connected to the output terminal; and
    disconnect both the first power conduit and the second power conduit as a function of the load feedback signal.

14. The circuit of claim 1, wherein the at least a parameter output component is connected to a power source management system of at least one of the first power source and the second power source.

15. The circuit of claim 1, wherein the at least a parameter output component is a current sensor.

16. The circuit of claim 1, wherein at least one of first power source and second power source includes a high energy density power source.

17. The circuit of claim 1, wherein at least one of first power source and second power source includes a high power density power source.

18. The circuit of claim 1, wherein at least one of first power source and second power source includes a capacitor.

19. The circuit of claim 1, wherein at least one of first power source and second power source includes a power generation system.

* * * * *